April 12, 1960   R. H. SPEAKMAN ET AL   2,932,062
APPARATUS FOR MELT SPINNING
Filed March 25, 1958
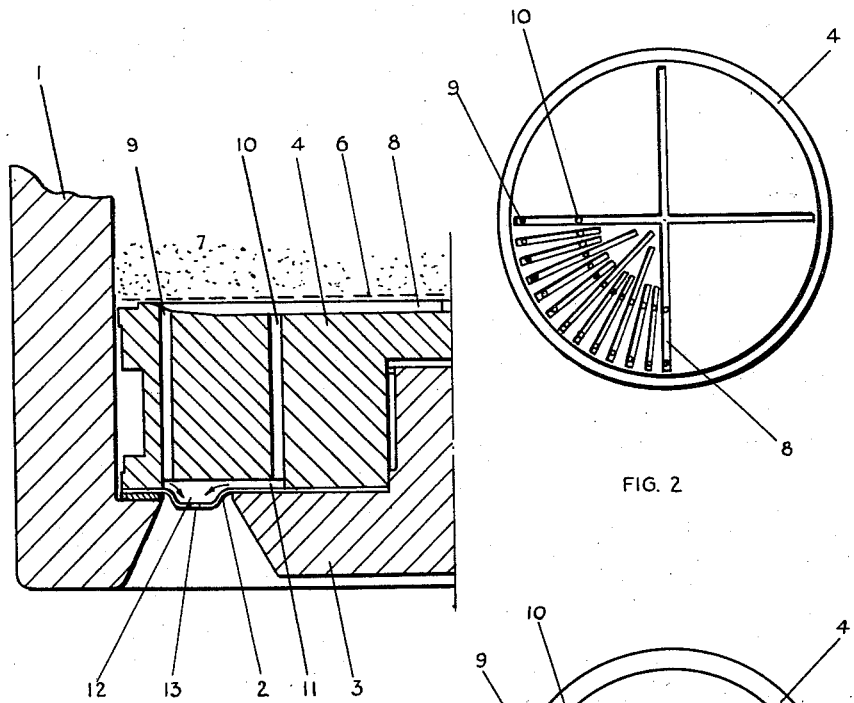
FIG. 1
FIG. 2
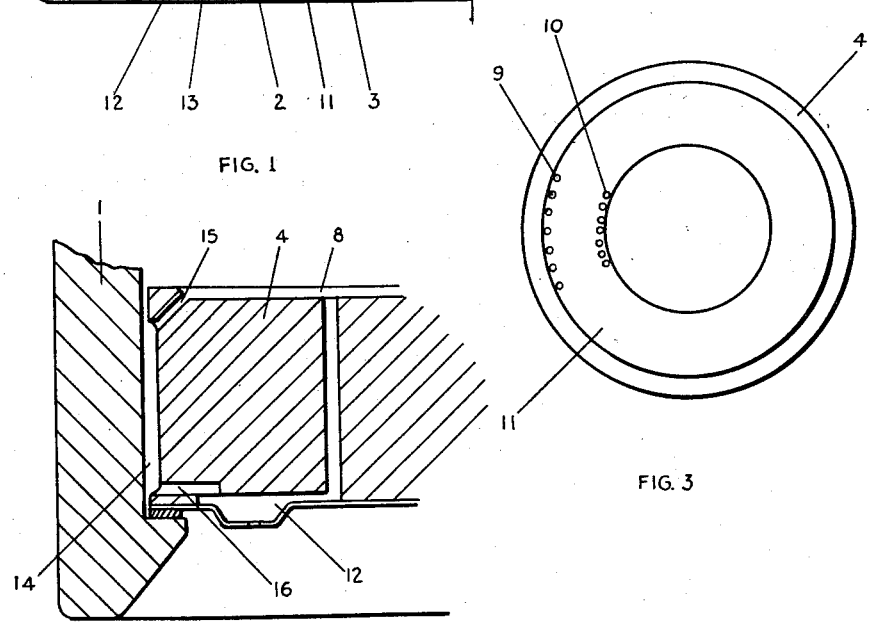
FIG. 3
FIG. 4
INVENTORS
RAYMOND HOLDEN SPEAKMAN
JAMES ROBINSON
BY Cushman, Darby & Cushman
ATTORNEYS

United States Patent Office 2,932,062
Patented Apr. 12, 1960

2,932,062

APPARATUS FOR MELT SPINNING

Raymond Holden Speakman and James Robinson, Harrogate, England, assignors to Imperial Chemical Industries Limited, London, England, a corporation of Great Britain Application March 25, 1958, Serial No. 723,773

Claims priority, application Great Britain April 3, 1957

3 Claims. (Cl. 18—8)

This invention relates to an apparatus for the extrusion of molten polymers and particularly to melt spinning.

In the melt spinning of polyamides and polyesters it is common practice to pump the molten polymers through a filter pack comprising a cylindrical metal body within which there is a filtration medium, usually sand, contained within fine mesh stainless steel gauzes. The gauzes are supported by a perforated metal plate (hereinafter called the distributor plate), located above the spinneret in such a manner that the filtered molten polymer may flow under pressure uniformly to all the spinneret holes.

When using such a pack in conjunction with spinnerets in which all the holes lie in an annular trough pressed or stamped in the spinneret plate, we have found that zones of semi-stagnant degraded polymer form in the recess made where the distributor plate touches the spinneret on either side of the trough. At intervals this degraded polymer enters the main stream thus contaminating and weakening the resultant filaments.

We have also found that degraded polymer forms between the distributor plate and the pack body, and that this degraded polymer may enter the filament forming polymer stream if the sealing pressure within the pack is temporarily released, as for instance when the pumps are stopped and then restarted after a period of time. A pack, through which the polymer stream has been thus stopped and re-started has to be spun to waste for a considerable time to clear the degraded polymer before useful fibres can be collected again.

According to our invention we provide an apparatus for the extrusion of molten polymers wherein the molten polymer is pumped through a filter pack containing a filtration medium, a melt distributor plate and a spinneret, the holes of which lie in an annular trough characterised in that the top surface of the distributor plate has a number of radial channels each of which is connected by a duct or ducts to an annular channel on the underside of said distributor plate, said annular channel being located above the annular trough of the spinneret and said annular channel being at least as wide as the upper width of the annular trough and said duct or ducts entering the channel near the edge or edges thereof.

In one embodiment of our invention, each radial channel is provided with two ducts the outer duct leading to the outer edge of the annular channel on the underside of the distributor plate and the inner duct leading to the inner edge of said channel.

When using the apparatus of our invention for the melt spinning of polymers, the molten polymer sweeps continuously through the space between the distributor plate and the spinneret without any chance of hold-up.

In one form of our invention the molten polymer, whilst being pumped through the pack to the spinneret, is caused to flow continuously between the sides of the distributor plate and the inside wall of the pack. Thus by the continuous flushing out of a part of the spinning pack where previously the molten polymer was almost stagnant, the formation and accumulation of thermally degraded polymer is avoided.

The enclosed schematic drawings, Figs. 1, 2, 3 and 4 illustrate but do not limit the scope of our invention.

Fig. 1 is a half-section of the lower portion of a melt spinning pack.

Figs. 2 and 3 are plan views of the upper and lower faces of the distributor plate and Fig. 4 illustrates a preferred embodiment.

In Fig. 1 the back body 1 supports the outer rim of an annular spinneret 2 the inner rim of which is supported by the lock nut 3 which screws into the distributor plate 4. Stainless steel mesh screens 6 contain the sand filter 7. Radial channels 8 are cut in the top face of plate 4 and the ducts 9 and 10 connect the radial channels 8 to the annular channel 11. An annular trough 12 in the spinneret 2 contains a number of fine holes 13.

In use, the molten polymer flows through the sand 7 and gauzes 6 into the channels 8 of the distributor plate 4 and along these channels to the ducts 9 and 10 through which it flows into the trough 12 in the direction of the arrows and thence through the spinneret holes 13.

In a preferred embodiment of our invention the molten polymer flows along the radial channels 8 to the outer edge of the spinneret trough 12 through an annular recess 14 between the distributor plate 4 and the pack body 1. The recess 14 is connected to the radial channels 8 by the ducts 15 and to the spinneret trough 12 by the ducts 16.

The apparatus of our invention is particularly suitable for the melt spinning of high polymers, for example, polyethylene terephthalate. We have found that using a distributor plate in which the ducts do not enter the annular channel near the edges much wastage of filaments occurs due to the formation of small almost stagnant pools of thermally degraded polymer in the recess made where the distributor plate touches the spinneret on either side of the trough. These small pools intermittently dislodge themselves from the recess and enter the polymer stream, thus causing a break in extrusion from one or more of the spinneret holes or the formation of weak points in the filaments.

This phenomenon does not occur however, when using the distributor plates of our invention and filaments that are free from the imperfections caused by thermally degraded polymer are produced as the polymer melt sweeps continuously through the space between the distributor plate and the spinneret.

When stopping and re-starting a melt spinning apparatus which contains a distributor plate other than that described as our preferred embodiment, wherein an annular recess is provided between the sides of the distributor and the pack body through which the polymer melt is pumped, we have found it necessary to spin filaments to wasten for about half an hour in order to remove the thermally degraded polymer which accumulates between the sides of the distributor plate and the pack body whilst the pack is sealed by the internal pressure and which escapes into the main body of the pack when the internal pressures are relieved when spinning is stopped.

Using the preferred embodiment of our invention as illustrated in Fig. 4 of the attached drawings we have found that it is no longer necessary to spin to waste for half an hour after a stoppage because no thermally degraded polymer is produced during spinning and any thermally degraded polymer that is found whilst spinning is stopped, is cleared from the pack almost immediately that the pumps are restarted.

What we claim is:

1. An apparatus for the extrusion of molten polymers wherein the molten polymer is pumped through a filter pack containing a filtration medium, a melt distributor plate and a spinneret having an annular trough therein with holes being formed in said trough, said apparatus being characterised in that the top surface of the distributor plate has a number of radial channels therein, an annular channel on the underside of said distributor plate, duct means connecting said radial channels to said annular channel, said annular channel being located above the annular trough of the spinneret and said annular charnel being at least as wide as the upper width of the annular trough and said duct means entering the channel near the circumferential edge or edges thereof.

2. An apparatus according to claim 1 wherein each radial channel is provided with two ducts the outer duct leading to the outer edge of the annular channel on the underside of the distributor plate and the inner duct leading to the inner edge of said channel.

3. An apparatus according to claim 1 and further comprising means providing for flow of molten polymer continuously between the sides of the distributor plate and the inside wall of the pack.

References Cited in the file of this patent

UNITED STATES PATENTS

| | | |
|---|---|---|
| 883,423 | Taylor | Oct. 18, 1932 |

FOREIGN PATENTS

| | | |
|---|---|---|
| 536,803 | Canada | Feb. 5, 1957 |